July 21, 1925.

J. F. PANYARD 1,546,401

PISTON AND CYLINDER CONSTRUCTION

Filed May 9, 1925 2 Sheets-Sheet 1

INVENTOR.

BY *John F. Panyard*
*Parker + Burton*
ATTORNEY.

Patented July 21, 1925.

1,546,401

UNITED STATES PATENT OFFICE.

JOHN F. PANYARD, OF DETROIT, MICHIGAN.

PISTON AND CYLINDER CONSTRUCTION.

Application filed May 9, 1925. Serial No. 29,270.

*To all whom it may concern:*

Be it known that I, JOHN F. PANYARD, a citizen of the United States, residing at Detroit, county of Wayne, State of Michigan, have invented a certain new and useful Improvement in Piston and Cylinder Constructions, and declare the following to be a full, clear, and exact description of the same, such as will enable others skilled in the art to which it pertains to make and use the same, reference being had to the accompanying drawings, which form a part of this specification.

My invention relates to piston and cylinder construction.

An object is to provide a cylinder with a piston having a groove to collect lubricant from the wall of the cylinder and discharge it into the interior of the piston to prevent seepage of the lubricant beyond the packing in excess of the amount required for necessary lubrication.

This application is a continuation in part of my application, Serial No. 680,837, filed on December 15, 1923.

An important feature is the provision in a horizontally disposed cylinder (or a cylinder positioned at such an angle to the perpendicular as to have an upper and a lower side) of a hollow piston having a suitably positioned annular groove formed in its outer surface which discharges into the interior of the piston. This discharge is located on the upper side of the piston so that lubricant on the cylinder wall collects in the groove during the travel of the piston and is pumped upwardly in the groove as the piston travels in the cylinder and discharges through the opening on the upper side of the piston into the interior thereof from which it may be exhausted after a satisfactory manner. As this groove has no communication with the interior of the piston on the under side the reverse flow of lubricant from the interior of the piston to the groove is not possible.

I prefer to show my lubricant collecting groove as deepened on the upper side of the piston into an arcuate kerf which extends into the hollow interior of the piston so that lubricant pumped upwardly through the groove may flow over each side of the kerf into the interior of the piston.

Figure 1:
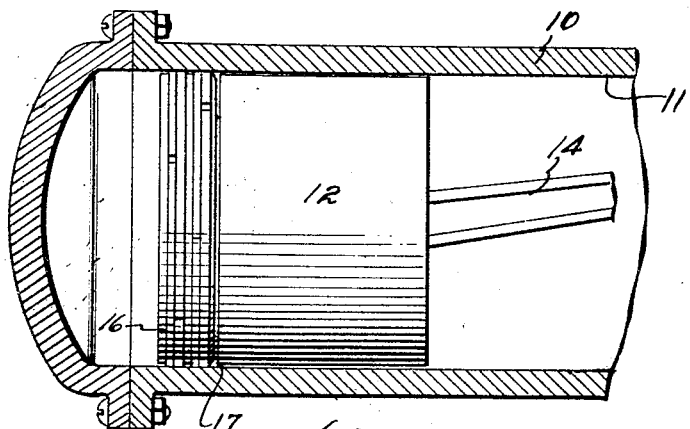
Figure 1 is a sectional view through a cylinder showing my improved piston in elevation.
Figure 2:
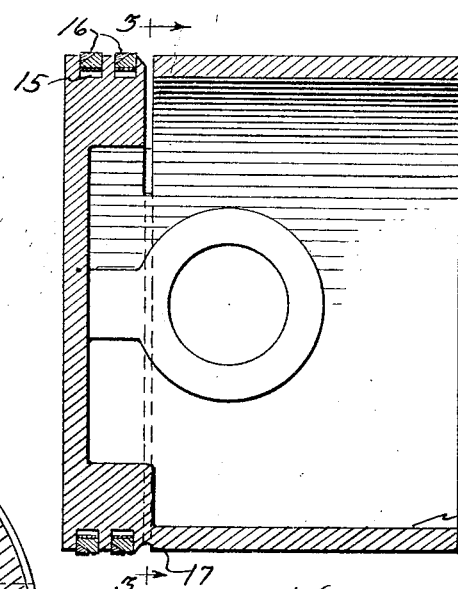
Fig. 2 is a cross-sectional view through my improved piston.
Figure 3:
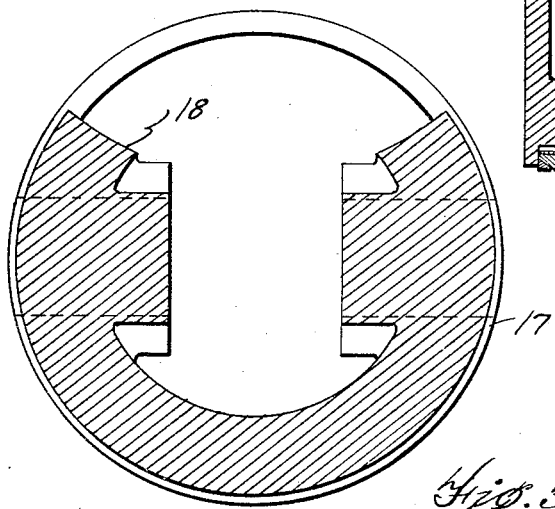
Fig. 3 is a cross-sectional view taken on line 3—3, Fig. 2.

In the drawings, let 10 indicate a horizontally disposed cylinder having a bore 11. This cylinder is provided with a piston 12 which is hollowed out at 13 and mounted upon a connecting rod 14. Suitable packing rings 16 are provided disposed in grooves 15 formed in the piston. My invention consists in providing this piston with a lubricant groove or annular passageway formed in its outer surface and encircling the piston in close proximity and below the packing rings. This groove has a discharge opening on the upper side of the piston leading to the interior of the piston. A convenient arrangement is to deepen the groove on the upper side of the piston into an arcuate kerf 18. It will be seen that in Fig. 3 the groove proper terminates at opposite ends in this kerf 18 which leads into the interior of the piston to discharge lubricant therein.

In conventional piston and cylinder construction lubricant gathered on the cylinder wall is forced outwardly ahead of the traveling piston and a certain amount of lubricant remains in the cylinder to lubricate the same. It frequently happens, however, that an excessive lubricant remains in the cylinder and leaks beyond the packing. This is commonly termed oil pumping and is very undesirable. It is particularly noticeable in connection with horizontally disposed cylinders.

In my improved construction the lubricant in the cylinder in excess of the amount required for proper lubrication and that ordinarily expelled by the traveling piston is collected in the lubricant groove 17 and pumped upwardly through the groove to discharge into the kerf 18 and from there into the interior of the piston. As the interior of the piston does not communicate on its under side with the groove 17 there is no opportunity for lubricant to leak out from the interior of the piston into the groove in the cylinder and during the travel of the piston the excess amount of lubricant is pumped upwardly through the groove and deposited into the interior of the piston.

Figure 4:
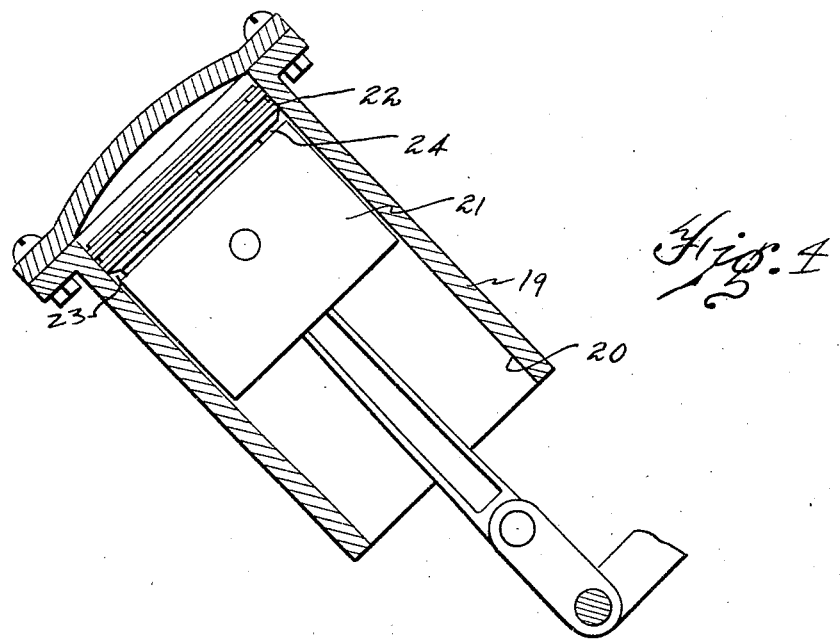
Fig. 4 is a cross-sectional view through a cylinder of a V-type motor showing my improved piston in elevation.
Figure 5:
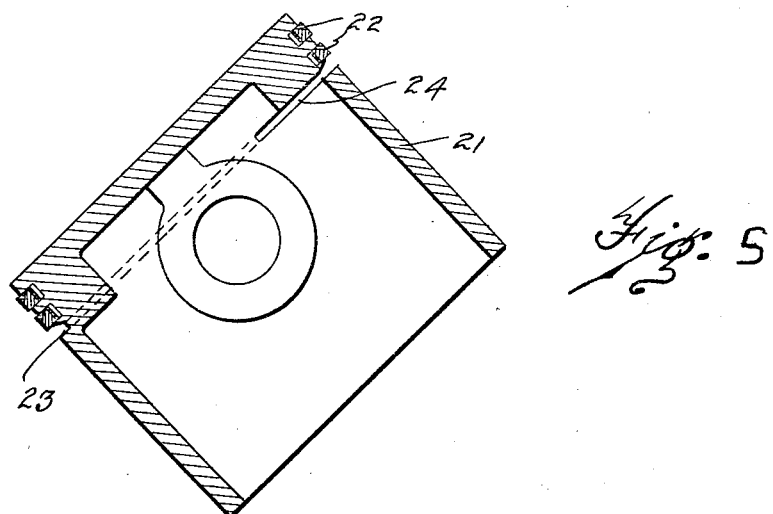
Fig. 5 is a cross sectional view through the piston shown in Fig. 4.

The construction shown in Figs. 4 and 5 corresponds with that just described except that the working piston is illustrated in connection with one of the cylinders of a V-type engine. Cylinder 19, having a bore 20, is provided with a hollow working piston 21. This piston is fitted with packing rings 22 and there is formed about the piston an annular lubricant groove 23 which is deepened on the upper side of the piston into a kerf 24 which communicates with the interior of the piston to discharge lubricant thereinto.

What I claim is:

1. In a piston and cylinder construction, a horizontally disposed cylinder, a hollow piston therein having its outer surface cut away to form a circumferential passageway having a discharge opening on the upper side of the piston which leads to the interior thereof.

2. In a piston and cylinder construction, a horizontally disposed cylinder, a hollow piston therein having its outer surface cut away to form a continuous passageway leading to a discharge opening located on the upper side of the piston and opening into the interior thereof.

3. In a piston and cylinder construction, a horizontally disposed cylinder, a hollow piston therein provided with an annular lubricant groove formed in the outer surface thereof, which groove terminates on the upper side of the piston in a kerf through the piston wall into the interior thereof.

4. In a piston and cylinder construction, a horizontally disposed cylinder, a hollow piston therein, said piston having a circumferential channel formed in its outer face and terminating on the upper side thereof on opposite sides of an arcuate kerf through the piston wall into the interior of the piston.

5. In a piston and cylinder construction, a horizontally disposed cylinder, a hollow piston therein, said piston having an encircling lubricant-carrying channel deepened upon the upper side of the piston to discharge into the interior.

6. In a piston and cylinder construction, a horizontally disposed cylinder, a hollow piston therein, said piston provided with a circumferential groove for lubricant having a discharge opening into the interior of the piston on the upper side of the piston only.

7. In piston and cylinder construction, a horizontally disposed cylinder, a hollow piston therein, said piston having a lubricant-collecting groove formed in its outer surface, which groove has a discharge opening into the interior of the piston on the upper side thereof.

8. In piston and cylinder construction, a horizontally disposed cylinder, a hollow piston therein, said piston provided with suitable packing having a circumferential lubricant-collecting groove below the packing and adjacent thereto, which groove opens into the interior of the piston to discharge therein on the upper side of the piston only.

9. In piston and cylinder construction, a cylinder positioned at an angle to the perpendicular to have an upper side and a lower side, a hollow working piston therein having an annular lubricant groove provided with a discharge opening on the upper side of the piston leading into the interior thereof.

10. In piston and cylinder construction, a cylinder positioned at an angle to the perpendicular to have an upper side and a lower side, a working piston therein, said piston provided with a circumferential groove for lubricant having a discharge opening into the interior of the piston on the upper side of the piston only.

In testimony whereof, I sign this specification.

JOHN F. PANYARD.